(12) United States Patent
Cha et al.

(10) Patent No.: US 12,400,119 B2
(45) Date of Patent: Aug. 26, 2025

(54) LEARNING METHOD AND SYSTEM FOR OBJECT TRACKING BASED ON HYBRID NEURAL NETWORK

(71) Applicant: SAMSUNG ELECTRONICS CO., LTD., Suwon-si (KR)

(72) Inventors: Moon Hyun Cha, Suwon-si (KR); Il Chae Jung, Seoul (KR); Bo Hyung Han, Seoul (KR); Daeyoung Park, Ulsan (KR); Changwook Jeong, Ulsan (KR)

(73) Assignees: Samsung Electronics Co., Ltd. (KR); Seoul National University R&DB Foundation (KR)

( * ) Notice: Subject to any disclaimer, the term of this patent is extended or adjusted under 35 U.S.C. 154(b) by 332 days.

(21) Appl. No.: 17/972,831

(22) Filed: Oct. 25, 2022

(65) Prior Publication Data

US 2023/0153624 A1 May 18, 2023

(30) Foreign Application Priority Data

Nov. 16, 2021 (KR) .......................... 10-2021-0158035
Jul. 13, 2022 (KR) .......................... 10-2022-0086571

(51) Int. Cl.
*G06N 3/082* (2023.01)
*G06N 3/045* (2023.01)
*G06T 7/20* (2017.01)

(52) U.S. Cl.
CPC ............. *G06N 3/082* (2013.01); *G06N 3/045* (2023.01); *G06T 7/20* (2013.01)

(58) Field of Classification Search
CPC ........ G06N 3/082; G06N 3/045; G06N 3/084; G06N 3/08; G06N 3/04; G06N 3/063; G06N 3/044; G06N 3/048; G06T 7/20; G06T 2207/20081; G06T 2207/20084; G06T 7/246; G06T 7/001; G06T 9/00; G06T 9/002; G06V 10/82; G06V 10/761; G06V 10/806; G06V 2201/06; G06F 17/18; G06F 16/58
See application file for complete search history.

(56) References Cited

U.S. PATENT DOCUMENTS

| 10,346,742 | B2 * | 7/2019 | Iso ..................... G06F 11/0721 |
| 10,395,140 | B1 * | 8/2019 | Kim ..................... G06F 18/241 |
| 10,621,486 | B2 | 4/2020 | Yao |

(Continued)

FOREIGN PATENT DOCUMENTS

KR 10-2021-0035678 A 4/2021

*Primary Examiner* — Michael S Osinski
(74) *Attorney, Agent, or Firm* — Fish & Richardson P.C.

(57) ABSTRACT

An object tracking learning system includes a first neural network module that expresses and learns a first parameter for an input image from a first type to a second type and outputs the learned result as a first learning result, a second neural network module that removes and learns a connection of a part of a second parameter for the input image and outputs the learned result as a second learning result, a prediction module that generates a prediction value for an object of the input image from a summation result obtained by summing the first learning result and the second learning result, and an optimization module that updates the first parameter and the second parameter based on the prediction value.

16 Claims, 9 Drawing Sheets

(56) References Cited

U.S. PATENT DOCUMENTS

| | | | |
|---|---|---|---|
| 10,796,169 B2* | 10/2020 | Kadav | G06V 10/82 |
| 10,917,121 B2 | 2/2021 | Lee et al. | |
| 11,748,600 B2* | 9/2023 | Sasagawa | G06N 3/063 |
| | | | 706/25 |
| 11,775,611 B2* | 10/2023 | Fang | G06N 3/08 |
| | | | 708/422 |
| 12,014,273 B2* | 6/2024 | Wu | G06N 3/045 |
| 12,073,309 B2* | 8/2024 | Park | G06F 18/21 |
| 12,093,816 B1* | 9/2024 | Drimbarean | G06N 3/084 |
| 12,169,774 B2* | 12/2024 | Lazovich | G06T 9/002 |
| 12,175,208 B2* | 12/2024 | Song | G06N 3/063 |
| 12,260,626 B2* | 3/2025 | Nie | G06V 10/806 |
| 2007/0244842 A1* | 10/2007 | Ishii | G06T 7/12 |
| | | | 706/18 |
| 2009/0257501 A1* | 10/2009 | Ye | H04N 19/117 |
| | | | 375/E7.243 |
| 2017/0337471 A1* | 11/2017 | Kadav | G06V 20/52 |
| 2018/0046894 A1 | 2/2018 | Yao | |
| 2019/0244604 A1* | 8/2019 | Masataki | G10L 15/183 |
| 2019/0347550 A1 | 11/2019 | Jung et al. | |
| 2019/0347554 A1 | 11/2019 | Choi et al. | |
| 2020/0125887 A1* | 4/2020 | Nishii | G01M 17/027 |
| 2020/0126241 A1* | 4/2020 | Wang | G06N 3/048 |
| 2020/0242445 A1* | 7/2020 | de Vangel | G06N 3/04 |
| 2020/0293893 A1 | 9/2020 | Georgiadis et al. | |
| 2020/0373946 A1 | 11/2020 | Lee et al. | |
| 2020/0394278 A1* | 12/2020 | Varon-Weinryb | G06F 17/18 |
| 2021/0012232 A1* | 1/2021 | Lei | G06N 3/08 |
| 2021/0089922 A1 | 3/2021 | Lu et al. | |
| 2021/0150284 A1* | 5/2021 | Chiang | G06N 3/045 |
| 2021/0150363 A1* | 5/2021 | Yang | G06N 3/045 |
| 2022/0100793 A1* | 3/2022 | Xi | G06V 40/155 |
| 2023/0298219 A1* | 9/2023 | Galpin | H04N 19/61 |
| | | | 382/232 |
| 2023/0410285 A1* | 12/2023 | Okuno | G06T 7/001 |
| 2024/0054622 A1* | 2/2024 | Chen | H04N 19/172 |

* cited by examiner

| Method | Bit | TotalHsize | Prec | Succ | Method | Bit | TotalHsize | Prec | Succ |
|---|---|---|---|---|---|---|---|---|---|
| RT-MDNet | 32 | 1.00 | 85.3 | 61.9 | SiamRPN++ | 32 | 1.00 | 87.6(90.5) | 66.3(69.5) |
| Q | 4 | 0.20 | 83.7 | 62.8 | Q | 5 | 0.24 | 87.3 | 67.1 |
| Q + P | 4 | 0.26 | 84.9 | 63.1 | Q + P | 5 | 0.32 | 89.5 | 68.5 | ical Field

Embodiments of the present disclosure relate to a learning method and system for object tracking, and more particularly, relate to a learning method and system for object tracking based on a hybrid neural network.

2. Discussion of the Related Art

An object tracking technology using a neural network, for example, a deep neural network (DNN) is being actively developed. However, to ensure the accuracy of object detection, the number of parameters required for a DNN is continually increasing. For example, the 2014 winning model of the ImageNet Large Scale Visual Recognition Challenge (ILSVRC) has the top-1 accuracy of 74.8% with 4 million parameters. On the other hand, the 2017 winning model has the top-1 accuracy of 82.7% with 145.8 million parameters. In other words, the number of parameters has increased by about 36 times three years.

Accordingly, there is a demand for mechanisms for reducing the weight of a neural network or accelerating the neural network, and such mechanisms should be capable of quickly performing computation efficiently with minimized resources while the accuracy of object detection is maintained or the loss of accuracy is minimized.

LEARNING METHOD AND SYSTEM FOR OBJECT TRACKING BASED ON HYBRID NEURAL NETWORK

CROSS-REFERENCE TO RELATED APPLICATIONS

This U.S. non-provisional patent application claims priority under 35 U.S.C. § 119 to Korean Patent Application No. 10-2021-0158035, filed on Nov. 16, 2021 in the Korean Intellectual Property Office, and to Korean Patent Application No. 10-2022-0086571, filed on Jul. 13, 2022, in the Korean Intellectual Property Office, the disclosures of which are incorporated by reference herein in their entireties.

BACKGROUND

1. Technical Field

Embodiments of the present disclosure relate to a learning method and system for object tracking, and more particularly, relate to a learning method and system for object tracking based on a hybrid neural network.

2. Discussion of the Related Art

An object tracking technology using a neural network, for example, a deep neural network (DNN) is being actively developed. However, to ensure the accuracy of object detection, the number of parameters required for a DNN is continually increasing. For example, the 2014 winning model of the ImageNet Large Scale Visual Recognition Challenge (ILSVRC) has the top-1 accuracy of 74.8% with 4 million parameters. On the other hand, the 2017 winning model has the top-1 accuracy of 82.7% with 145.8 million parameters. In other words, the number of parameters has increased by about 36 times three years.

Accordingly, there is a demand for mechanisms for reducing the weight of a neural network or accelerating the neural network, and such mechanisms should be capable of quickly performing computation efficiently with minimized resources while the accuracy of object detection is maintained or the loss of accuracy is minimized.

SUMMARY

Embodiments of the present disclosure provide a hybrid neural network-based object tracking learning method and system that may quickly perform computation efficiently with minimized resources while accuracy is maintained.

According to an embodiment, a hybrid neural network-based object tracking learning system includes a first neural network module, a second neural network module, a prediction module, and an optimization module. The first neural network module expresses and learns a first parameter for an input image from a first type to a second type and outputs the learned result as a first learning result. The second neural network module removes and learns a connection of a part of a second parameter for the input image and outputs the learned result as a second learning result. The prediction module generates a prediction value for an object of the input image from a summation result obtained by summing the first learning result and the second learning result. The optimization module updates the first parameter and the second parameter based on the prediction value.

According to another embodiment, an object tracking learning system includes at least two neural network modules, a prediction module, and an optimization module. The two neural network modules are of types different from each other. The prediction module is configured to generate a prediction value from a summation result obtained by summing learning results of the at least two neural network modules. The optimization module is configured to update parameters of the at least two neural networks based on the prediction value. The summation result includes at least two elements expressed in a heterogeneous format.

According to yet another embodiment, a hybrid neural network-based object tracking learning method includes expressing a first parameter for an input image from a first type to a second type and outputting an expressed result as a first learning result, removing a connection of a part of a second parameter for the input image and outputting the removed result as a second learning result, generating a prediction value based on a summation result obtained by summing the first learning result and the second learning result, and updating the first parameter and the second parameter based on the prediction value.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure may be described in detail and clearly to such an extent that one of ordinary skill in the relevant art(s) easily implements the present disclosure.

Figure 1:
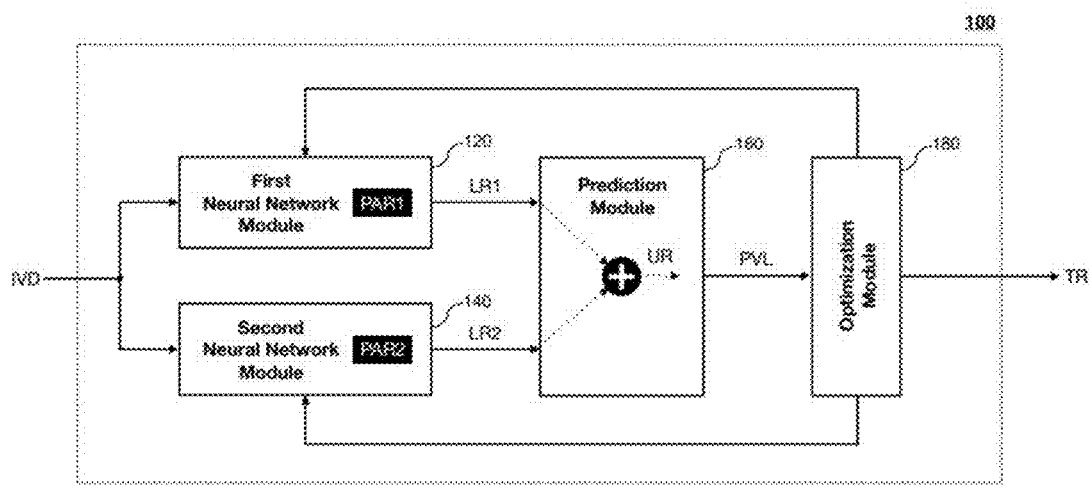
FIG. 1 is a diagram illustrating a hybrid neural network-based object tracking learning system, according to an embodiment of the present disclosure.
Figure 2:
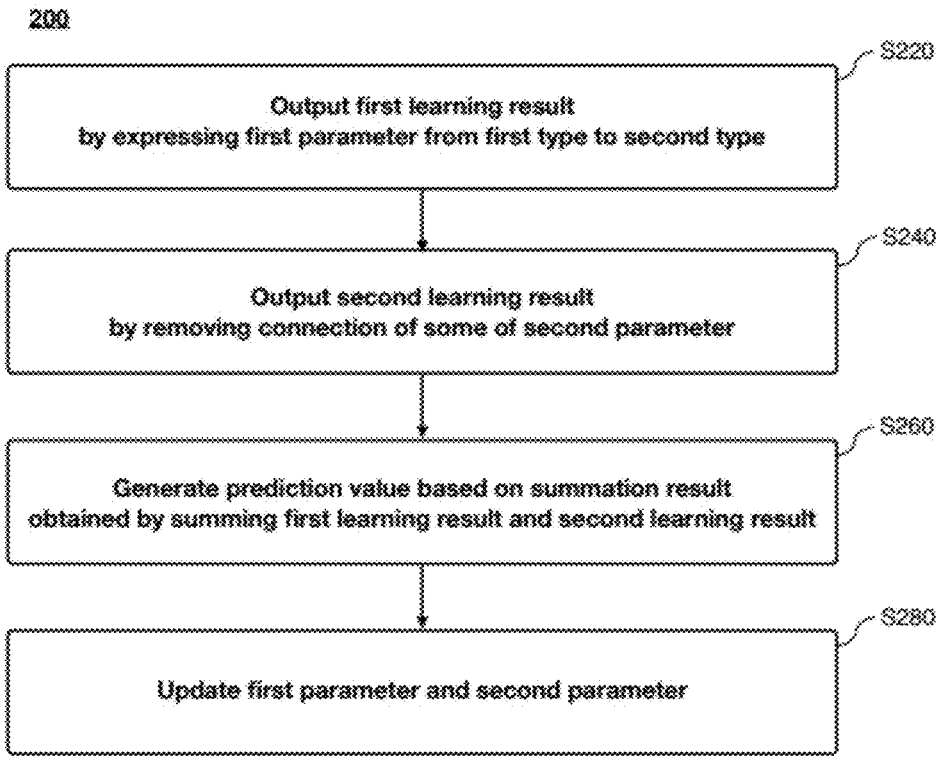
FIG. 2 is a diagram illustrating a hybrid neural network-based object tracking learning method, according to an embodiment of the present disclosure.

FIG. 1 is a diagram illustrating a hybrid neural network-based object tracking learning system, according to an embodiment of the present disclosure. FIG. 2 is a diagram illustrating a hybrid neural network-based object tracking learning method, according to an embodiment of the present disclosure.

Referring to FIG. 1 and FIG. 2, a hybrid neural network-based version of the object tracking learning system 100 according to an embodiment of the present disclosure may include a first neural network module 120, a second neural network module 140, a prediction module 160, and an optimization module 180, and may accurately and quickly perform tracking learning on an object of an input image IVD. As described herein, learning in the context of a neural network is a process by which the neural network optimize weight and bias values to make an accurate prediction.

Before proceeding, it should be clear that Figures herein, including FIG. 1 as described below, show and reference elements that are or include circuitry with labels such as "module" and "unit" including "neural network module", "prediction module", "optimization module", "quantization unit", "output unit", "selection unit", "summation unit", "generating unit", "adjusting unit", "performing unit", "pre-training module", "tracking module", and "learning module" or similar terms analogous to "circuit" or "block". As is traditional in the field of the inventive concept(s) described herein, examples may be described and illustrated in terms of such labelled elements which carry out a described function or functions. These labelled elements, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting such labelled elements may be implemented by dedicated hardware, or by a processor (e.g., one or more programmed microprocessors and associated circuitry), or by a combination of dedicated hardware to perform some functions of the labelled element and a processor to perform other functions of the labelled element. Each labelled element of the examples may be physically separated into two or more interacting and discrete circuits without departing from the scope of the present disclosure.

In FIG. 1, the object-tracking learning system 100 may comprise one or more processors and one or more memories that store software modules for execution by the processor(s). As such, the first neural network module 120, the second neural network module 140, the prediction module 160, and the optimization module 180 in FIG. 1, as well as other modules and units described herein, may be understood to comprise modules of software stored in one or more memories and executed by one or more processors. Alternatively, these modules and units may be understood to comprise individual application-specific integrated circuits that each perform the functions attributed thereto herein. As another set of alternatives, these modules and units may be understood to comprise a mixture of processor/memory combinations for some of the modules and units, and application-specific integrated circuits for others of the modules and units.

A hybrid neural network-based version of the object tracking learning method 200 according to an embodiment of the present disclosure may include operation S220 of outputting a first learning result, operation S240 of outputting a second learning result, operation S260 of generating a prediction value, and operation S280 of updating a parameter. The hybrid neural network-based version of the object tracking learning method 200 may accurately and quickly perform object tracking learning on the input image IVD.

The object tracking learning system 100 according to some embodiments of the present disclosure may operate in the object tracking learning method 200 according to these embodiments of the present disclosure. Moreover, the object tracking learning method 200 may be executed by the object tracking learning system 100. For example, one or more processors on a fixed or mobile imaging device, a mobile communications device, a vehicle computer, or a server may implement the first neural network module 120, the second neural network module 140, the prediction module 160 and the optimization module 180 by executing software. In one embodiment, different modules among these modules may be implemented by different cores of a multi-core processor executing software. However, embodiments of the present disclosure are not limited thereto. The object tracking learning system 100 may operate in a method different from the object tracking learning method 200. Furthermore, the object tracking learning method 200 may be executed by a system different from the object tracking learning system 100. However, for convenience of description, only an example in which the object tracking learning system 100 operates in the object tracking learning method 200 and the object tracking learning method 200 is executed by the object tracking learning system 100 will be described below.

Continuing to refer to FIG. 1 and FIG. 2, the first neural network module 120 according to an embodiment of the present disclosure outputs a first learning result LR1 by expressing and learning a first parameter PAR1 for the input image IVD from the first type to the second type (S220). As explained more below, the first parameter PAR1 may be a convolution filter (i.e., a weight)

The first neural network module 120 may include a first neural network. For example, the first neural network module 120 may include the first neural network, which extracts a useful feature from the input image IVD and classifies the input image IVD into classes. A first lightweight algorithm may be applied to the first neural network. The first neural network may consist of a plurality of layers. In each of the layers, a convolution operation with a corresponding filter or kernel may be performed on the input image IVD or the output (e.g., a feature map) of the previous layer. The first parameter PAR1 may be a convolution filter (i.e., a weight) in one such layer. A "parameter" as the term is used herein may comprise multiple parameters, as is described below. The first neural network may be implemented as a deep neural network (DNN) consisting of a plurality of hidden layers between an input layer and an output layer.

For example, the first neural network may learn a feature extractor $f_{conv}(\cdot;\cdot)$ for an arbitrary frame $A_0$ of an input image and may output a feature map $A_{conv}$ as a learning result as shown in Equation 1.

$$A_{conv} \equiv A_{N_i} = f_{conv}(A_0; \mathcal{W}_{conv}) \quad \text{[Equation 1]}$$

In this case, $\mathcal{W}_{conv}$ means a set $\{W_1, \ldots, W_{N_l}\}$ for an entire convolutional filter of the first neural network up to a $N_l$ layer.

The first neural network module 120 may reduce the precision of the first parameter PAR1 for the input image IVD by applying a first lightweight algorithm, thereby reducing the amount of computation in each of the layers of the DNN. The first parameter PAR1 may be a convolution filter (i.e., a weight), which is differently applied to a corresponding node or unit of each layer.

In this case, the output of an $i^{th}$ layer, that is, a feature map $A_i$, may be generated as in Equation 2 below.

$$A_i = \sigma(A_{i-1} * W_i) \quad \text{[Equation 2]}$$

In Equation 2, a function $\sigma(\cdot)$ denotes a nonlinear activation function, and an operator '*' denotes a convolution operation. That is, the output $A_i$ of the $i^{th}$ layer may be generated by applying an activation function to the result of a convolution operation of an output $A_{i-1}$ of the (i−1)-th layer, which is the previous layer of the $i^{th}$ layer, and a weight $W_i$ of the $i^{th}$ layer. The output $A_i$ may be delivered to an (i+1)-th layer, which is the next layer. For example, the function $\sigma(\cdot)$ may be implemented as one of a sigmoid function or a rectified linear unit function (ReLU). However, the present disclosure is not limited thereto and the function $\sigma(\cdot)$ may be implemented with another activation function.

Accordingly, the first learning result LR1 of the first neural network module 120, that is, the output $A^q$ of the output layer of the first neural network, may be as shown in Equation 3 below.

$$A^q = f^q(A_0; \mathcal{W}^q), \; \mathcal{W}^q = \{W_1^q, \ldots, W_{N_l}^q\} \quad \text{[Equation 3]}$$

The first learning result LR1 refers to a result, to which the first lightweight algorithm $f^q(\cdot;\cdot)$ is applied, to reduce the amount of computation in a learning process. This will be described in more detail below. For some embodiments, the terms "parameter", "weight", "kernel", or "filter" may be used interchangeably or have the same meaning. Also, for some embodiments, the terms of an "output", "feature map", and "activation map" of each layer may be used interchangeably or have the same meaning.

Figure 3:
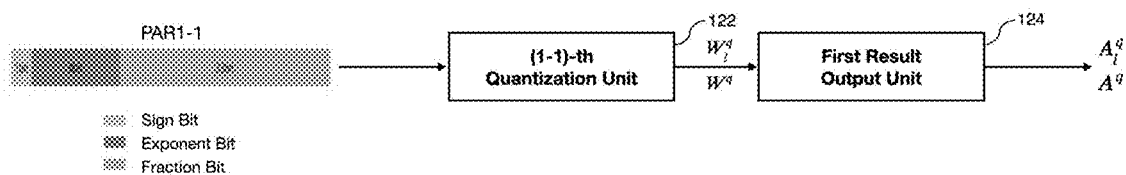
FIG. 3 is a diagram illustrating a first neural network module, according to an embodiment of the present disclosure.
Figure 4:
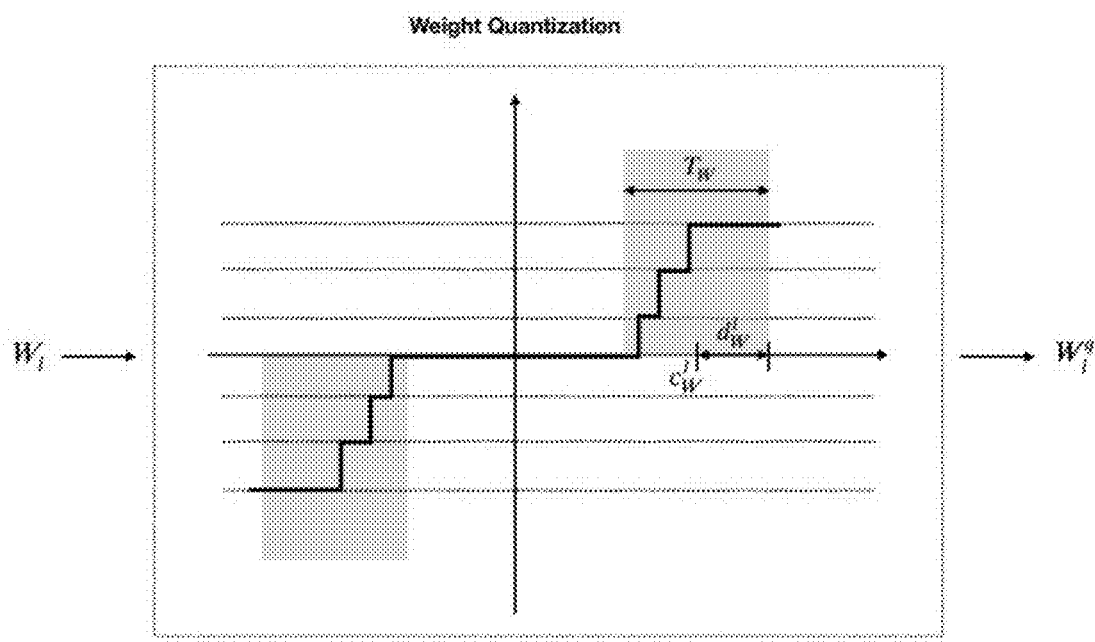
FIG. 4 is a diagram for describing an operation of a (1-1)-th quantization unit, according to an embodiment of the present disclosure.

FIG. 3 is a diagram illustrating a first neural network module, according to an embodiment of the present disclosure. FIG. 4 is a diagram for describing an operation of a (1-1)-th quantization unit, according to an embodiment of the present disclosure.

Referring to FIG. 1, FIG. 3, and FIG. 4, as described above, a first lightweight algorithm may be applied to the first neural network module 120 according to an embodiment of the present disclosure. For example, the first lightweight algorithm may refer to quantization as described below, and may specifically relate to a low bit quantization algorithm.

To this end, the first neural network module 120 according to an embodiment of the present disclosure may include a (1-1)-th quantization unit 122. That is, to reduce the amount of computation, the first neural network module 120 may include the (1-1)-th quantization unit 122 that quantizes a (1-1)-th parameter PAR1-1 having the first type into the (1-1)-th parameter PAR1-1 having the second type that has the amount of computation less than the first type.

The parameter PAR1-1 may be one type of the first parameter PAR1. For example, the (1-1)-th parameter PAR1-1 may refer to a weight of the first neural network.

In this case, the first type may be a real number type and the second type may be an integer type. For example, the first type may be expressed as a 32-bit floating point number, and the second type may be expressed as a 4-bit integer. FIG. 3 illustrates a 32-bit floating-point format according to the IEEE 754 standard, but the first type described herein is not limited thereto.

In this case, in quantizing the (1-1)-th parameter PAR1-1 having the first type of a real number type to the (1-1)-th parameter PAR1-1 having the second type of an integer type, the (1-1)-th quantization unit 122 of the first neural network module 120 may correspond to a center $c_W$ and a width $d_W$ of a target interval $T_W$ for the (1-1)-th parameter PAR1-1 having the first type.

For example, when the (1-1)-th parameter PAR1-1 having the first type is a weight $W_l$ for the $l^{th}$ layer of the first neural network, the (1-1)-th quantization unit 122 may perform a quantization operation by inputting an arbitrary weight $w_l$ among weights $W_l$ for the $l^{th}$ layer through a weight quantization function $Q_W^l(\cdot)$, and may output the result as $w_l^q$. For example, the weight $W_l$ for the $l^{th}$ layer may be a convolution filter of x*y matrix, and the weight $W_l$ may be an arbitrary element of a matrix of weights $w_l$.

The weight quantization function $Q_W^l(\cdot)$ in the (1-1)-th quantization unit 122 may generate an output $W_l^q$ for the weight $W_l$ by performing the following two-step operation.

First, the arbitrary weight $w_l$ of the $l^{th}$ layer may be linearly transformed into a value within an interval $[-1.1]$ by the center $c_W$ and the width $d_W$ of the learnable target interval $T_W$. That is, only the arbitrary weight $w_l$ within the first quantization interval $[c_W^l + d_W^l, c_W^l - d_W^l]$ may be quantized and the others may be fixed to "±1" or "0". This may be expressed by Equation 4 below.

$$\hat{w}_l = \begin{cases} \text{sign}(w_l) & \text{if } |w_l| > c_W^l + d_W^l \\ 0 & \text{if } |w_l| < c_W^l - d_W^l \\ \text{sign}(w_l) \cdot (\alpha_W^l |w_l| + \beta_W^l) & \text{otherwise} \end{cases} \quad \text{[Equation 4]}$$

In Equation 4, a function $\text{sign}(\cdot)$ means a sign of the input $w_l$, and $\alpha_W^l$ and $\beta_W^l$ mean "$0.5/d_W^l$" and "$-0.5 c_W^l/d_W^l + 0.5$" respectively.

Next, the weight $W_l$ for the $l^{th}$ layer quantized by Equation 4 may be normalized to $W_l^q$ a by Equation 5 below.

$$W_l^q = \text{round}(\hat{W}_l \cdot (2^{N_b - 1} - 1)) \quad \text{[Equation 5]}$$

In Equation 5, a function $\text{round}(\cdot)$ means element-wise rounding (i.e., rounding up or rounding down a value having an element-wise decimal point or less), and $N_b$ denotes a bit width (the number of bits) according to a quantization level. For example, in case of quantization having 4 bits, $N_b$ may be 4.

The target interval $T_W$ for the parameter PAR1-1 may be set based on the accuracy or amount of computation required for the object tracking learning method and system according to some embodiments of the present disclosure.

The first neural network module 120 according to an embodiment of the present disclosure may further include a first result output unit 124 that generates an output $A_l^q$ of an arbitrary layer corresponding to a weight $W_l^q$ quantized by the (1-1)-th quantization unit 122. For example, the first result output unit 124 may output the result $A_l^q$ for the $l^{th}$ layer by substituting the weight $W_l^q$ of Equation 5 for the $l^{th}$ layer into Equation 2. In this case, the first result output unit 124 may output an output of the final layer of the first neural network (i.e., an output $A^q$ of the output layer) as the first learning result LR1 of the first neural network module 120.

The outputs $(W_l^q, A_l^q)$ for each layer of the (1-1)-th quantization unit 122 and the first result output unit 124 according to an embodiment of the present disclosure may be stored in a storage means (not shown) inside or outside the first neural network module 120 and then may be used when an output for the next layer is generated. For example, the (1-1)-th quantization unit 122 may generate a set $\mathcal{W}^q$ of quantized weights $W_l^q$ for each layer in Equation 3. In this case, the first result output unit 124 may generate the first learning result LR1 based on the quantized weight set $\mathcal{W}^q$.

Figure 5:
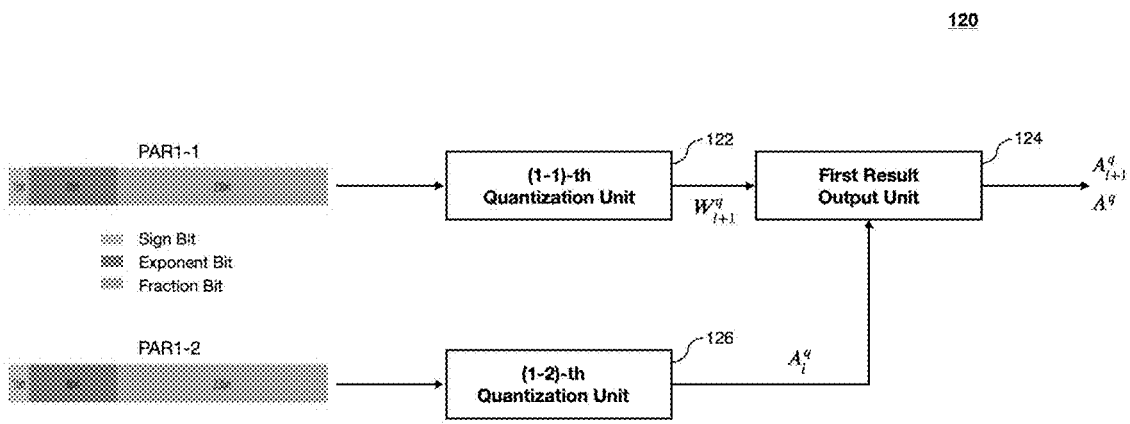
FIG. 5 is a diagram illustrating a first neural network module, according to an embodiment of the present disclosure.

FIG. 5 is a diagram illustrating a first neural network module, according to an embodiment of the present disclosure.

Figure 6:
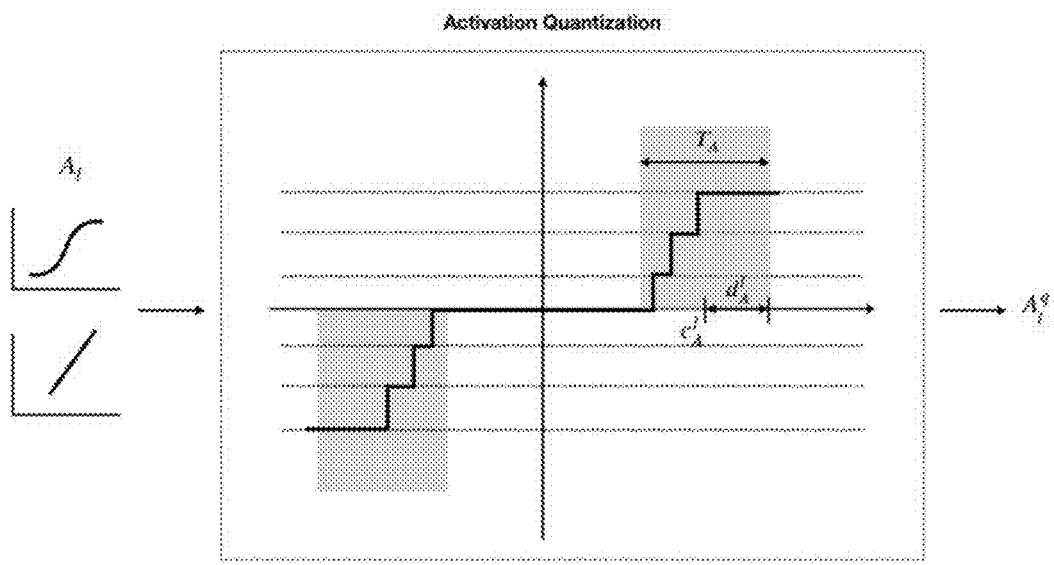
FIG. 6 is a diagram for describing an operation of a (1-2)-th quantization unit, according to an embodiment of the present disclosure.

FIG. 6 is a diagram for describing an operation of a (1-2)-th quantization unit, according to an embodiment of the present disclosure.

Referring to FIG. 1, FIG. 5, and FIG. 6, the first neural network module 120 according to an embodiment of the present disclosure may include the (1-1)-th quantization unit 122, a (1-2)-th quantization unit 126, and the first result output unit 124. The (1-1)-th quantization unit 122 may operate in the same manner as described with reference to FIG. 3 and FIG. 4.

The first neural network module 120 according to an embodiment of the present disclosure may include the (1-2)-th quantization unit 126 that further performs quantization on a (1-2)-th parameter PAR1-2 as well as the (1-1)-th parameter PAR1-1. For example, the (1-2)-th parameter PAR1-2 may be an activation map or an activation value of each layer of the first neural network.

For example, the (1-2)-th quantization unit 126 may perform quantization to reduce the amount of computation for the (1-2)-th parameter PAR1-2. The (1-2)-th quantization unit 126 may quantize the (1-2)-th parameter PAR1-2 having the first type to the (1-2)-th parameter PAR1-2 having the second type. As described above, the first type may be a real number type and the second type may be an integer type.

In quantizing the (1-2)-th parameter PAR1-2 having the first type of a real number type to the (1-2)-th parameter PAR1-2 having the second type of an integer type, the (1-2)-th quantization unit 126 of the first neural network module 120 may correspond to a center $c_A$ and a width $d_A$ of a target interval $T_A$ for the (1-2)-th parameter PAR1-2 of the first type.

For example, the (1-2)-th quantization unit 126 may perform a quantization operation on an activation value $a_l$ of the activation map $A_l$ for the $l^{th}$ layer through an activation quantization function $Q_A^l(\cdot)$ and may output the result $a_l^q$. For example, the activation map $A_l$ for the $l^{th}$ layer may be expressed as a p*q matrix, and the activation value $a_l$ may be any element of a matrix of the activation map $A_l$.

The activation quantization function $Q_A^l(\cdot)$ in the (1-2)-th quantization unit 126 may generate an output $A_l^q$ for the activation map $A_l$ by performing the following two-step operation.

First, the activation value $a_1$ of the $l^{th}$ layer may be linearly transformed into a value within a specific interval by the center $c_A$ and the width $d_A$ of a learnable target interval $T_A$. For example, when the activation function is an ReLU function, the activation value $a_l$ of the $l^{th}$ layer may be linearly transformed into a value within an interval [0,1]. That is, only the activation value $a_1$ within the second quantization interval $[c_A^l + d_A^l, c_A^l - d_A^l]$ may be quantized and the other values thereof may be fixed to "1" or "0". This may be expressed by Equation 6 below.

$$\hat{a}_l = \begin{cases} 1 & \text{if } a_l > c_A^l + d_A^l \\ 0 & \text{if } a_l < c_A^l - d_A^l \\ \alpha_A^l A_l + \beta_A^l & \text{otherwise} \end{cases} \quad \text{[Equation 6]}$$

In Equation 6, $\alpha_A^l$ and $\beta_A^l$ mean "$0.5/d_A^l$" and "$-0.5c_A^l/d_A^l+0.5$" respectively.

Next, the (1-2)-th parameter PAR1-2 may be normalized by Equation 7 below.

$$A_l^q = \text{round}(\hat{A}_l(2^{N_b}-1)) \quad \text{[Equation 7]}$$

In Equation 7, a function round(·) means an output of the individual element of $A_l$ (i.e., rounding up or rounding down a value having a decimal point or less for a respective output $a_l^q$), and $N_b$ denotes a bit width (the number of bits) according to a quantization level. For example, in case of quantization having 4 bits, $N_b$ may be 4.

The target interval $T_A$ for the first type of the (1-2)-th parameter PAR1-2 may be set based on the accuracy or amount of computation required for the object tracking learning method and system according to some embodiments of the present disclosure.

The first result output unit 124 may receive $Q_W^{l+1}(W_{l+1})$, which is a quantization result of a (1+1)-th parameter $W_{l+1}$ of the (1+1)-th layer, from the (1-1)-th quantization unit 122, may receive a quantization result $Q_A^l(A_l)$ of the (1-2)-th parameter $A_l$ of the $l^{th}$ layer from the (1-2)-th quantization unit 126, and may output an output $A_{l+1}$ of the corresponding (1+1)-th layer. For example, as in Equation 8, the first result output unit 124 may apply an activation function $\sigma(\cdot)$ to a result obtained by performing convolution on a quantization result $Q_A^l(A_l)$ of the (1-2)-th parameter $A_l$ of the $l^{th}$ layer and the quantization result $Q_W^{l+1}(W_{l+1})$ of the (1-1)-th parameter $W_{l+1}$ of the (1+1)-th layer and then may generate the output $A_{l+1}$ of the (1+1)$l^{th}$ layer.

$$A_{l+1} = \sigma(Q_A^l(A_l) * Q_W^{l+1}(W_{l+1})) \quad \text{[Equation 8]}$$

In this case, the first result output unit 124 may output an output $A^q$ of the output layer of the first neural network as the first learning result LR1 of the first neural network module 120.

Returning to FIG. 1 and FIG. 2, the second neural network module 140 according to an embodiment of the present disclosure removes and learns a connection of some of a second parameter PAR2 for the input image IVD and outputs a second learning result LR2 (S240).

The second neural network module 140 may include a second neural network. For example, the second neural network module 140 may include the second neural network, which extracts a useful feature from the input image IVD and classifies the input image IVD into classes. The second lightweight algorithm may be applied to the second neural network.

The neural network may have a configuration, which is identical or similar to the first neural network, other than a lightweight algorithm. That is, the second network consists of a plurality of layers. In each of the layers, a convolution operation with a corresponding filter or kernel may be performed on the input image IVD or the output (e.g., a feature map) of the previous layer. In addition, the second neural network may be implemented as a DNN consisting of a plurality of hidden layers between an input layer and an output layer.

The second neural network module 140 may remove a connection of some parameters of the second parameter PAR2 for the input image IVD by applying a second lightweight algorithm, thereby reducing the amount of computation in each of the layers of the DNN.

A parameter PAR2-1 may be one type of the second parameter PAR2. For example, a (2-1)$^{st}$ parameter PAR2-1 may be a weight of the second neural network (i.e., a weight differently applied to the corresponding node or unit of each layer of the second neural network). The $(2\text{-}1)^{st}$ parameter PAR2-1 may have the same value as the (1-1)-th parameter PAR1-1 of the first type for the first neural network.

Accordingly, the second learning result LR2 of the second neural network module 140, for example, an output $A^p$ of the output layer of the second neural network, may be as shown in Equation 9 below.

$$A^P = f^p(A_0; \mathcal{W}^p), \mathcal{W}^p = \{W_1^P, \ldots, W_{N_l}^P\} \qquad \text{[Equation 9]}$$

The second learning result LR2 of the second neural network module 140 refers to the result, to which the second lightweight algorithm $f^p(\cdot;\cdot)$ is applied, to reduce the amount of computation in a learning process. $\mathcal{W}^p$ means a set $\{W_1^P, \ldots, W_{N_l}^P\}$, of weights for the entire convolutional filter up to layer $N_l$.

Figure 7:
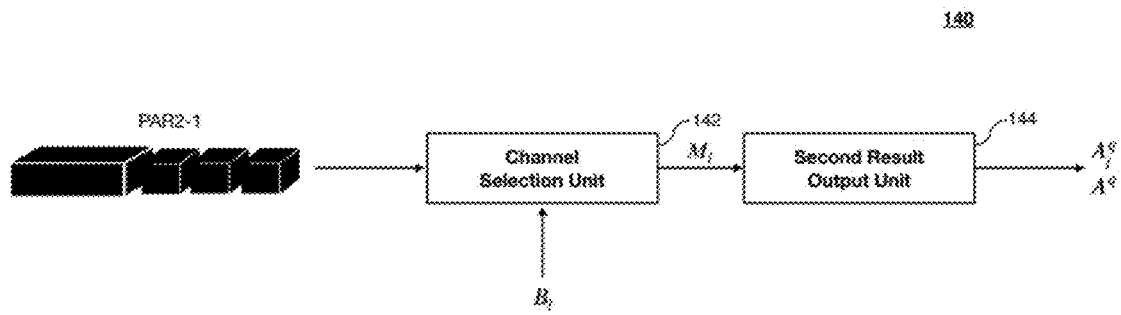
FIG. 7 is a diagram illustrating a second neural network module, according to an embodiment of the present disclosure.

FIG. 7 is a diagram illustrating a second neural network module, according to an embodiment of the present disclosure.

Referring to FIG. 7, as described above, a second lightweight algorithm may be applied to the second neural network module 140 according to an embodiment of the present disclosure. For example, the second lightweight algorithm relates to pruning, and more particularly, relates to a channel pruning algorithm having a compact or small full-precision type. Each layer of the second neural network consists of a connection of nodes or units, and the connection of the $(2\text{-}1)^{st}$ parameter PAR2-1 may be partially removed through the channel pruning algorithm that masks some channels of each layer. To this end, the second neural network module 140 according to an embodiment of the present disclosure may include a channel selection unit 142.

The channel selection unit 142 may sample a channel, which is to be masked, from among channels of each layer of the second neural network. The channel selection unit 142 may learn a set $\{B_1, \ldots, B_{N_l}\}$ of channel selection probability vectors for each layer. In this case, $B_l$ means a channel sampled in an $l^{th}$ layer. A channel selection probability vector may be a (2-2)-th parameter among the second parameter PAR2.

The channel selection unit 142 may normalize Equation 10 below by applying a Gumbel-Softmax technology, and may generate a discrete channel selection mask $M_l$ (i.e., a pruning mask $M_l$ for $l^{th}$ layer), as in Equation 11.

$$\overline{M}_l[i] = \frac{\exp\left(\frac{g_i + \log(b_l[i])}{\tau}\right)}{\exp\left(\frac{g_i + \log(b_l[i])}{\tau}\right) + \exp\left(\frac{g'_i + \log(1 - b_l[i])}{\tau}\right)} \qquad \text{[Equation 10]}$$

$$M_l[i] = \text{round}(\overline{M}_l[i]) \qquad \text{[Equation 11]}$$

In this case, $g_i$ and $g'_i$ represent random noise samples of Gumbel distribution, and $\tau$ represents a temperature. That is, when a channel selection probability vector for any channel of the $l^{th}$ layer is smaller than a threshold, the pruning mask $M_l$ of the corresponding channel may have a value of "0".

The second neural network module 140 according to an embodiment of the present disclosure may further include a second result output unit 144 that receives a weight $W_l^p$ for the $l^{th}$ layer, receives the pruning mask $M_l$ for the $l^{th}$ layer from the channel selection unit 142, and generates an output $A_l^p$ for the $l^{th}$ layer. In this case, the weight $W_l^p$ for the $l^{th}$ layer may be generated inside or outside the second neural network module 140 and may be delivered to the second result output unit 144. For example, the weight $W_l^p$ for the $l^{th}$ layer may be the same as the (1-1)-th parameter PAR1-1 having the first type used in the first neural network module 120.

For example, the second result output unit 144 may generate an output $A_l^p$ for the $l^{th}$ layer as in Equation 12.

$$A_l^P = \sigma(A_{l-1}^P * W_l^P) \odot M_l, l=1 \ldots N_l \qquad \text{[Equation 12]}$$

In this case, an operation $\odot$ denotes channel-wise multiplication. The output $A_l^p$ of the $l^{th}$ layer may be generated by performing channel-wise multiplication on a value, which is obtained by applying an activation function $\sigma(\cdot)$ to a result of convolution operation of the weight $W_l^p$ for the $l^{th}$ layer and an output $A_{l-1}^p$ of the (1-1)-th layer, and a pruning mask $M_l$ for the $l^{th}$ layer. Accordingly, a channel, in which the pruning mask $M_l$ is "0", from among channels of the $l^{th}$ layer may not affect the output $A_l^p$ for the $l^{th}$ layer.

The second result output unit 144 may output the final layer of the second neural network (i.e., the output of the output layer of the second neural network) as the second learning result LR2 of the second neural network module 140.

Returning to FIG. 1 and FIG. 2, the prediction module 160 according to an embodiment of the present disclosure generates a prediction value PVL for an object of the input image IVD from a summation result SR obtained by summing the first learning result LR1 and the second learning result LR2 (S260).

Figure 8:
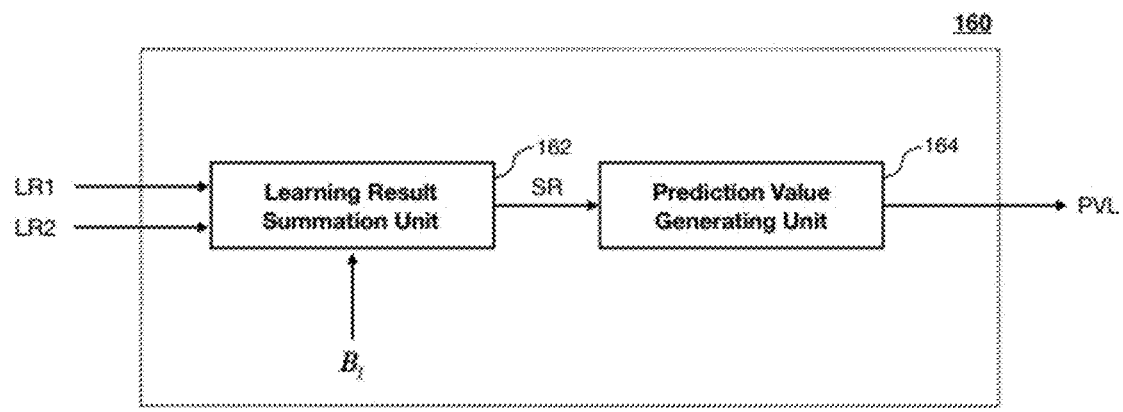
FIG. 8 is a diagram illustrating a prediction module, according to an embodiment of the present disclosure.

FIG. 8 is a diagram illustrating a prediction module, according to an embodiment of the present disclosure.

Referring to FIG. 8, the prediction module 160 according to an embodiment of the present disclosure may include a learning result summation unit 162 and a prediction value generating unit 164.

The learning result summation unit 162 may generate the summation result SR by summing the first learning result LR1 and the second learning result LR2. For example, when the first learning result LR1 is the same as Equation 3 and the second learning result LR2 is the same as Equation 9, the summation result SR may be the same as Equation 13.

$$A^h = A^q + A^p = f^q(A_0; \mathcal{W}^q) + f^p(A_0; \mathcal{W}^p) \qquad \text{[Equation 13]}$$

According to the above-described example, the first learning result LR1 may be generated through a quantization network, and the second learning result LR2 may be generated through a channel pruning network. Each of the learning results LR1 and LR2 may be expressed in a form of an activation map. At this time, the quantized first learning result LR1 may be a map expressed as an element having an integer type, and the second learning result LR2, on which channel pruning is performed, may be a map expressed as an element having a real number type. Elements having an integer type and a real number type may be mixed and expressed in the activation map that is the summation result SR.

The prediction value generating unit 164 may generate the prediction value PVL by predicting an object to be tracked from the summation result SR. For example, the prediction value PVL may refer to a location of an object to be tracked. For example, the prediction value PVL corresponding to information (coordinates, a width, a depth, or the like) of a sampled candidate group window or box for an object to be tracked may be generated from the summation result SR.

The prediction value generating unit 164 may generate the prediction value PVL by applying at least one of a regression model algorithm for predicting continuous values for an object to be tracked and a classification model algorithm for predicting the type of the object.

Returning to FIG. 1 and FIG. 2, the optimization module 180 according to an embodiment of the present disclosure updates the first parameter PAR1 and the second parameter PAR2 based on the prediction value PVL (S280). When the prediction value PVL satisfies a specific condition, the optimization module 180 may output the prediction value PVL as a tracking result TR for the object.

Figure 9:
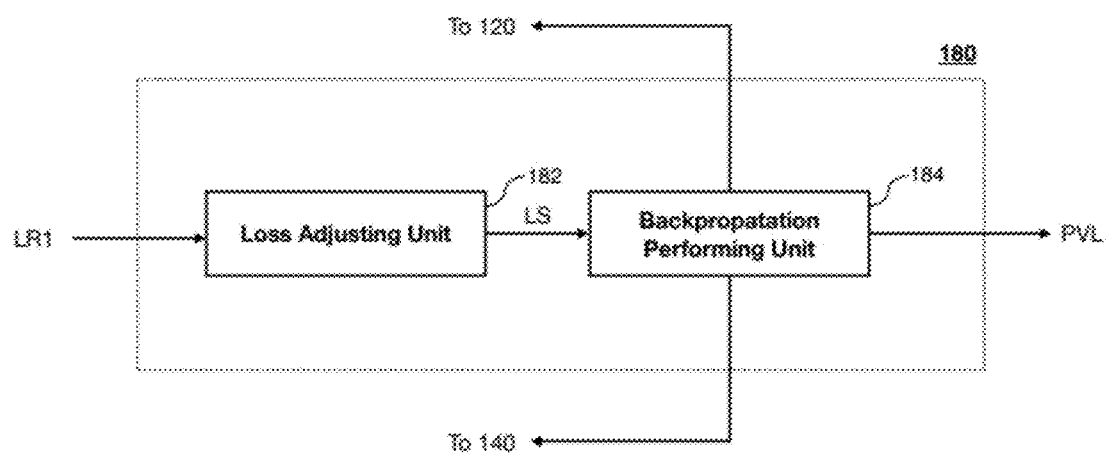
FIG. 9 and FIG. 10 are diagrams illustrating an optimization module, according to an embodiment of the present disclosure.
Figure 10:
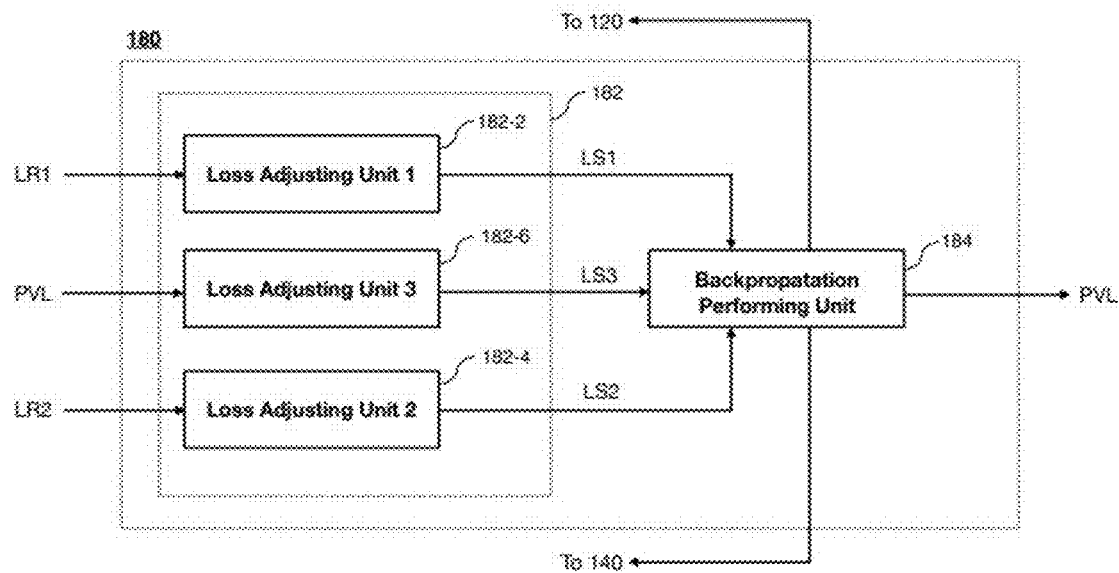

FIG. 9 and FIG. 10 are diagrams illustrating an optimization module, according to an embodiment of the present disclosure.

First of all, referring to FIG. 1 and FIG. 9, the optimization module 180 according to an embodiment of the present disclosure may include a loss adjusting unit 182 and a backpropagation performing unit 184.

The loss adjusting unit 182 may adjust a loss LS for the prediction value PVL so as to be a minimum value. When the loss LS becomes the minimum value, the prediction value PVL may be output as a tracking result for the object.

The loss adjusting unit 182 may apply a loss function such as Mean Square Error (MSE), Mean Absolute Error (MAE), and Root Mean Square Error (RMES) to a regression model and may apply a loss function such as Cross Entropy Error (CEE) to a classification model. Furthermore, in the loss adjusting unit 182 according to an embodiment of the present disclosure, normalization for the loss function may be applied.

The backpropagation performing unit 184 may perform backpropagation based on the loss LS adjusted by the loss adjusting unit 182. For example, the backpropagation performing unit 184 may update the first parameter PAR1 and the second parameter PAR2 for each layer of the neural network by using a gradient (a differential value) of the loss function.

The first neural network module 120 and the second neural network module 140 may output the accurate learning results LR1 and TR2 for object tracking by repeating learning depending on the updated first parameter PAR1 and the updated second parameter PAR2.

Next, referring to FIG. 1 and FIG. 10, as illustrated in FIG. 9, the optimization module 180 according to an embodiment of the present disclosure may include the loss adjusting unit 182 and the backpropagation performing unit 184. In this case, the loss adjusting unit 182 of FIG. 10 may include a first loss adjusting unit 182-2, a second loss adjusting unit 182-4, and a third loss adjusting unit 182-6.

The first loss adjusting unit 182-2 may calculate a loss for the first neural network module 120, that is, a first loss LS1 for the first learning result LR1. According to the above-described example, the first loss adjusting unit 182-2 may calculate a quantization regularization loss as the first loss LS1.

As in Equation 14, the first loss LS1 may be composed of a (1-1)-th loss LS1-1 for the (1-1)-th parameter and a (1-2)-th loss LS1-2 for the (1-2)-th parameter.

$$\mathcal{L}_{quant} = \mathcal{L}_{qW} + \mathcal{L}_{qA} \quad \text{[Equation 14]}$$

For example, the first loss adjusting unit 182-2 may normalize the (1-1)-th parameter PAR1-1 such that the (1-1)-th parameter PAR1-1 is located in a specific interval (e.g., a first quantization interval $[c_W^l + d_W^l, c_W^l - d_W^l]$), by calculating the (1-1)-th loss LS1-1 for the (1-1)-th parameter, which is a weight $W_i$, by using Equation 15. That is, each of arbitrary (1-1)-th parameters $c_W^l$ and $d_W^l$ may be learned to have an optimal value. Accordingly, an error, that is caused as the (1-1)-th parameter PAR1-1 is positioned outside a specific interval so as to be clipped, may be reduced.

$$\mathcal{L}_{qW} = \Sigma_{i=1}^{Nl}(\text{avg}(\alpha_W^i|W_i| + \beta_W^i) - \mu_0)^2 + (std(\alpha_W^i|W_i| + \beta_W^i) - \sigma_0)^2 \quad \text{[Equation 15]}$$

In Equation 15, functions avg(·) and std(·) represent the mean and standard deviation of all elements of a weight matrix $W_i$, respectively, and $\mu_0$ and $\sigma_0$ may mean hyperparameters for the mean and the standard deviation.

For example, the first loss adjusting unit 182-2 may normalize the (1-2)-th parameter PAR1-2 such that the (1-2)-th parameter PAR1-2 is located in a specific interval (e.g., a second quantization interval $[c_A^l + d_A^l, c_A^l - d_A^l]$), by calculating the (1-2)-th loss LS1-2 for the (1-2)-th parameter, which is an activation value $A_i$, by using Equation 16. That is, each of arbitrary (1-2)-th parameters $c_A^l$ and $d_A^l$ may be learned to have an optimal value. Accordingly, an error, that is caused as the (1-2)-th parameter PAR1-2 is positioned outside a specific interval so as to be clipped, may be reduced.

$$\mathcal{L}_{qA} = \sum_{i=1}^{N_l}\left[\text{avg}(A_i^{bn}) + 2 \cdot std(A_i^{bn}) - (c_A^l + d_A^l)\right]_+ + \left[\sigma_i - std(A_i^{bn})\right]_+ + \left[\mu_i - \text{avg}(A_i^{bn})\right]_+ \quad \text{[Equation 16]}$$

In Equation 16, $A_i^{bn}$ represents a set of activation values after batch normalization, and function $[\cdot]_+$ represents an ReLU function. $\sigma_i$ and $\mu_i$ may be determined by combining current quantization interval parameters $c_A^l$ and $d_A^l$. When an activation value $A_i^{bn}$ follows a Gaussian distribution, Equation 16 allows an activation value, which is greater than the Gaussian mean and is less than "$\text{avg}(A_i^{bn}) + 2 \cdot std(A_i^{bn})$", to be within an activation range.

The second loss adjusting unit 182-4 may calculate and adjust a loss for the second neural network module 140, that is, a second loss LS2 for the second learning result LR2. According to the above-described example, the second loss adjusting unit 182 may calculate a channel pruning regularization loss as the second loss LS2. In this case, the second loss adjusting unit 182-4 may allow the second neural network module 140 to perform learning such that the number of channels used to generate the second learning result LR2 is minimized.

For example, the second loss adjusting unit 182-4 may allow the second neural network module 140 to perform learning such that the channel selection probability vector $b_l$ of Equation 10 minimizes the loss of Equation 17.

$$\mathcal{L}_{prune} = \Sigma_{i=1}^{Nl}\|M_i\|_1 \quad \text{[Equation 17]}$$

The third loss adjusting unit 182-6 may calculate a third loss LS3 for the prediction value PVL. According to the above-described example, the third loss adjusting unit 182-6 may calculate an object tracking loss, an object classification loss, and a bounding box loss as the third loss LS3 by using the summation result SR and may adjust each loss so as to be minimized.

The backpropagation performing unit 184 may perform backpropagation based on the loss adjusted by the first loss adjusting unit 182-2, the second loss adjusting unit 182-4 and the third loss adjusting unit 182-6. For example, the backpropagation performing unit 184 may update the first parameter PAR1 and the second parameter PAR2 for each layer of the neural network by using a gradient (a differential value) of each loss function.

Returning to FIG. 1 and FIG. 2, the first neural network module 120 may learn rough basic information at low cost and the second neural network module 140 may learn complementary or residual information to increase fidelity to an original image frame. Thus the object tracking learning system 100 and the object tracking learning method 200 according to an embodiment of the present disclosure may perform a fast operation while maintaining accuracy, through the above-described structure and operation. That is, the object tracking learning system 100 and the object tracking learning method 200 according to an embodiment of the present disclosure may perform object tracking learning with both accuracy and efficiency by using a result of learning an efficient low bit-width quantization network and a precise channel pruning network.

As described above, a parameter according to some embodiments of the present disclosure may be a weight, an activation value, or a channel selection probability vector, but is not limited thereto. The parameter according to some embodiments of the present disclosure may be a bias value or the like. The content to be described below includes content similar to the content as described above, and repeated descriptions may be omitted for the sake of brevity.

Figure 11:
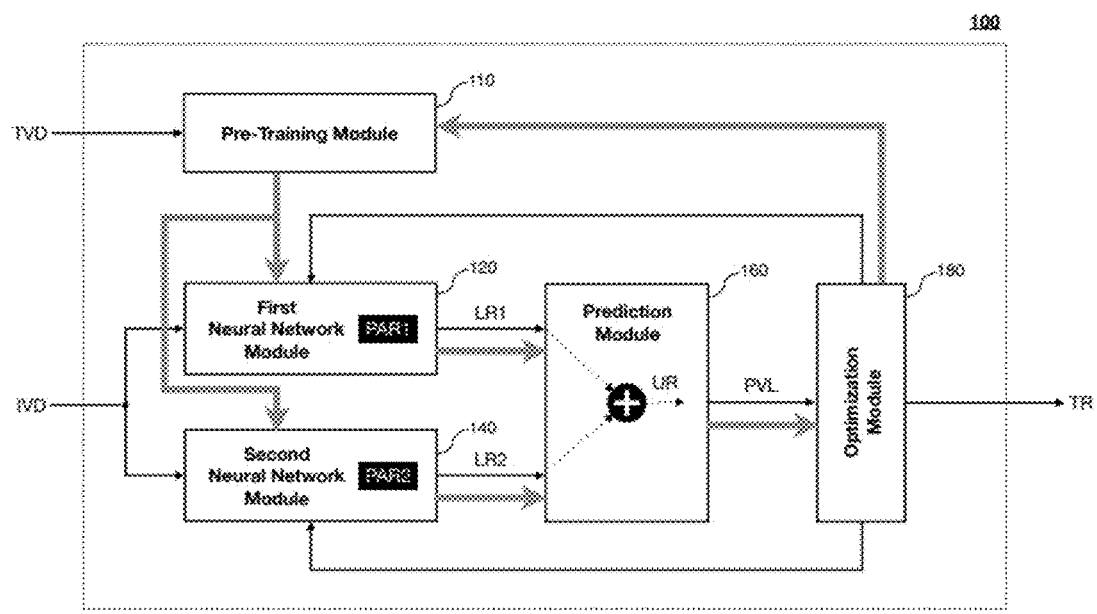
FIG. 11 and FIG. 12 are diagrams illustrating a hybrid neural network-based object tracking learning system, according to an embodiment of the present disclosure.
Figure 12:
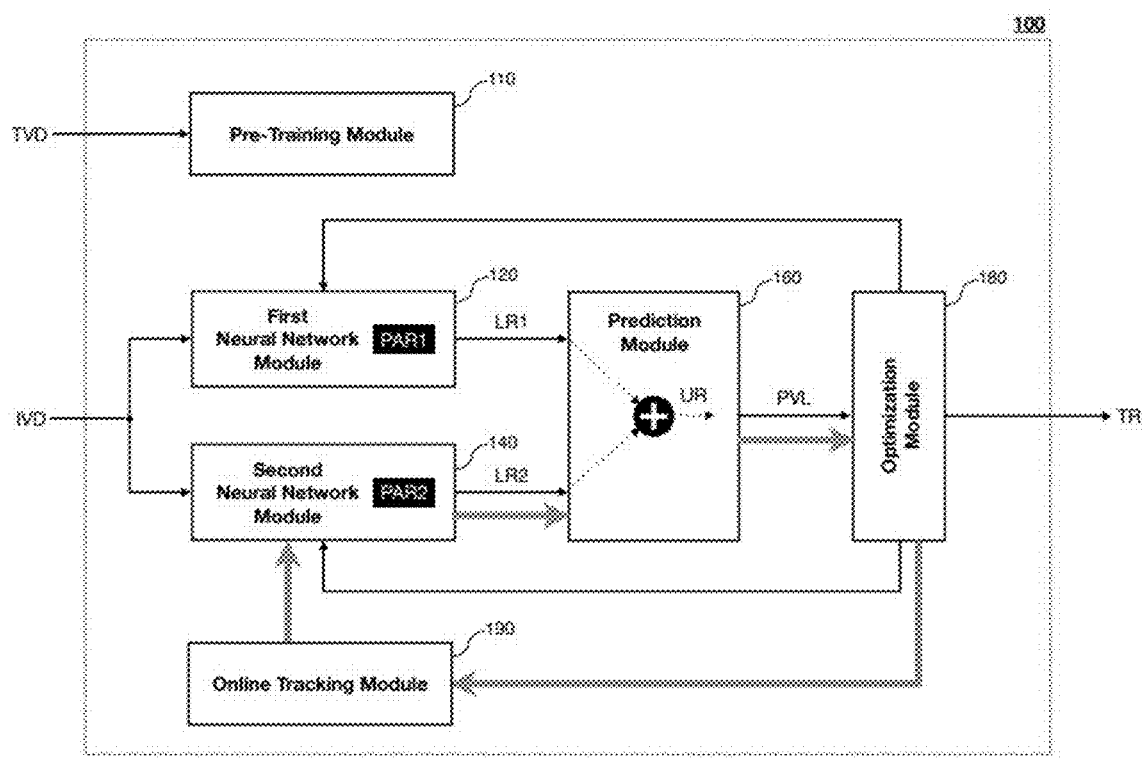

FIG. 11 and FIG. 12 are diagrams illustrating a hybrid neural network-based object tracking learning system, according to an embodiment of the present disclosure.

First of all, referring to FIG. 1 and FIG. 11, as illustrated in FIG. 1, the object tracking learning system 100 according to an embodiment of the present disclosure may include the first neural network module 120, the second neural network module 140, the prediction module 160, and the optimization module 180, and may accurately and quickly track an object of the input image IVD.

Furthermore, the object tracking learning system 100 of FIG. 11 may further include a pre-training module 110. The pre-training module 110 may perform pre-training for the first neural network module 120 and the second neural network module 140 on a test image TVD, and may set initial values of the first parameter PAR1 and the second parameter PAR2.

The first neural network module 120 and the second neural network module 140 may start object tracking learning in the input image IVD by using initial values PAR1-0 and PAR2-0 of the first parameter PAR1 and the second parameter PAR2, which are pre-trained by the pre-training module 110. As mentioned above, as the first parameter PAR1 and the second parameter PAR2 are updated by the optimization module 180, the object tracking learning system 100 according to an embodiment of the present disclosure may track an object more accurately.

First of all, referring to FIG. 1 and FIG. 12, as illustrated in FIG. 11, the object tracking learning system 100 according to an embodiment of the present disclosure may include the first neural network module 120, the second neural network module 140, the prediction module 160, and the optimization module 180, and the pre-training module 110, and may accurately and quickly track an object of the input image IVD.

Furthermore, the object tracking learning system 100 of FIG. 12 may further include an online tracking module 190. In this case, the input image IVD may be a streaming video. The online tracking module 190 may allow the second neural network module 140 to be learned in real time.

In the above example, the first neural network module 120 applies a lightweight model by applying a quantization algorithm, and the second neural network module 140 applied a lightweight model by applying a channel pruning algorithm. At this time, while processing main information or basic information about the input image IVD through the first neural network module 120 where the pre-learning result is maintained, the online tracking module 190 may allow the second neural network module 140 to perform learning in real time so as to update the pre-learning result such that visual changes in detailed information of the input image IVD is reflected. Accordingly, an object location of the input image IVD that changes in real time may be sequentially tracked.

In this case, the prediction module 160 may generate the prediction value PVL by adding the first learning result LR1, which is the pre-learning result, and the second learning result LR2, which is learned in real time, to the summation result SR, and the optimization module 180 may perform an optimization operation based on the prediction value PVL to which the real-time learned second learning result LR2 is reflected.

Figure 13:
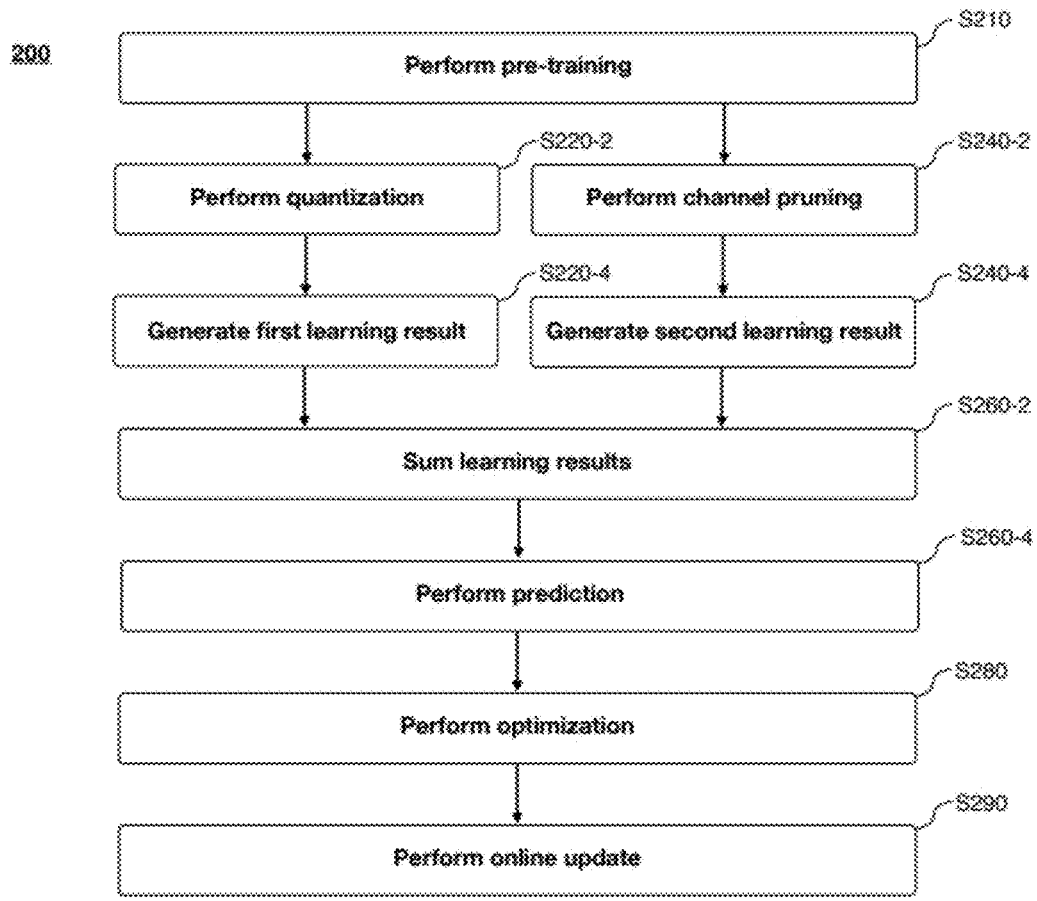
FIG. 13 and FIG. 14 are diagrams illustrating a hybrid neural network-based object tracking learning method, according to an embodiment of the present disclosure.
Figure 14:
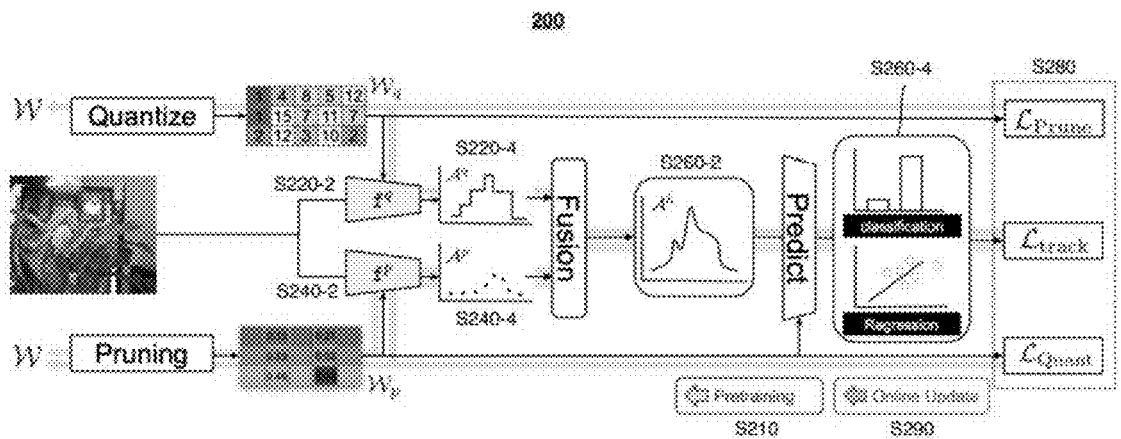

FIG. 13 and FIG. 14 are diagrams illustrating a hybrid neural network-based object tracking learning method, according to an embodiment of the present disclosure.

Referring to FIG. 13 and FIG. 14, the object tracking learning method 200 according to an embodiment of the present disclosure may include pre-training operation S210, quantization operation S220-2, channel pruning operation S240-2, first learning result generation operation S220-4, second learning result generation operation S240-4, learning result summing operation S260-2, prediction operation S260-4, optimization operation 280, and online update operation S290. A detailed description of each step may be the same or similar as described above.

As such, in accordance with the object tracking learning method and system according to an embodiment of the present disclosure, object tracking learning for streaming video capable of satisfying accuracy requirements with a small amount of resources is possible. Thus the present disclosure may be applied to fields such as false alarm detection or autonomous driving object detection, which requires real-time processing.

Figures 15, 16:
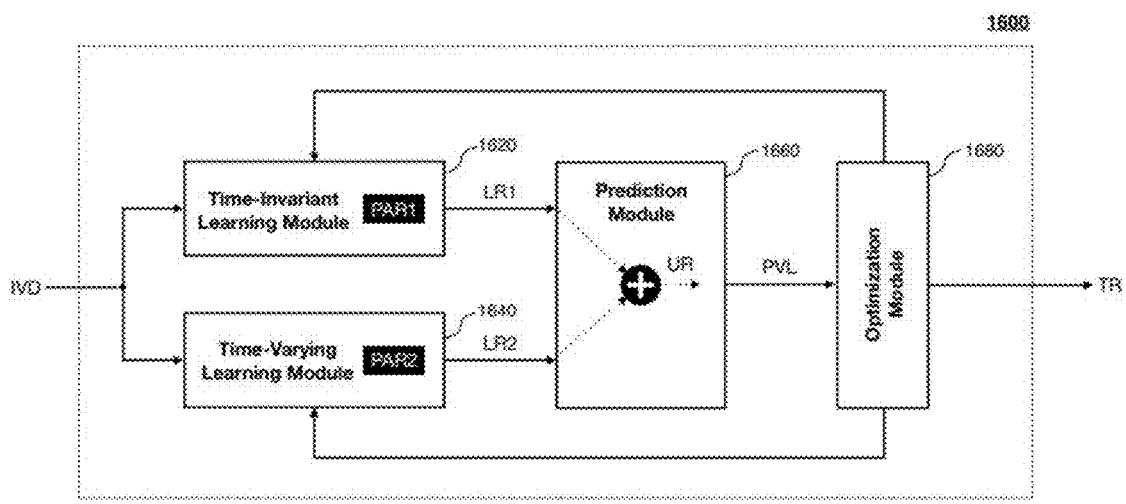
FIG. 15 is a table illustrating performance analysis of an object tracking learning system, according to an embodiment of the present disclosure.
FIG. 16, FIG. 17 and FIG. 18 are diagrams illustrating hybrid neural network-based object tracking learning systems, according to an embodiment of the present disclosure.

FIG. 15 is a table illustrating performance analysis of an object tracking learning system, according to an embodiment of the present disclosure.

Referring to FIG. 1 and FIG. 15, the object tracking learning system 100 according to an embodiment of the present disclosure may be implemented by plugging-in the above-described lightweight algorithm for a real time multi-domain convolution neural network tracker (RT-MDNet) or Siamese region proposal network (SiamRPN++) model. The results shown in the table of FIG. 15 show the performance in a case that a lightweight algorithm for each of RT-MDNet and SiamRPN++ is not applied, a case that a quantization (Q) algorithm is applied, and a case that quantization (Q) and pruning (P) algorithms are applied. In FIG. 15, quantization (Q) and pruning (P) may refer to a case that normalization is performed.

In FIG. 15, a computation overhead may be calculated through bitwise convolution operations (BOPs). TotalHsize indicates the relative amount of computation in the case that quantization (Q) and/or pruning (P) for the amount of computation of RT-MDNet and SiamRPN++ is applied based on BOPs. At this time, the amount of computation of RT-MDNet and SiamRPN++ is regarded as "1". When quantization (Q) and/or pruning (P) algorithms are applied, it may be seen that the number of bits decreased from 32 to 4 or 5, and the amount of computation significantly decreased from 1 to 0.2 to 0.32. It may be seen that a precision rate Prec for the amount of computation of RT- MDNet is changed from 85.3 to 83.7 (in a case of quantization (Q)) and 84.9 (in a case of quantization (Q) and pruning (P)) and a precision rate Prec for the amount of computation of SiamRPN++ is changed from 87.6 or 90.5 to 87.3 (in a case of quantization (Q)) and 89.5 (in a case of quantization (Q) and pruning (P)). Also, a success rate Succ indicates a result similar to a result for the precision rate. According to an embodiment, in the case of SiamRPN++, there is a difference between the precision rate and the success rate in research and practice. A value in parentheses indicates an actual test result.

That is, when only the quantization (Q) algorithm is applied, there is an effect of reducing the amount of computation by 4 to 5 times, but the deterioration in accuracy is large. On the other hand, as in the object tracking learning system 100 according to an embodiment of the present disclosure, it was identified that the accuracy of each of RT-MDNet and SiamRPN++ is almost restored when both a quantization (Q) algorithm and a pruning (P) algorithm are applied.

Figure 17:
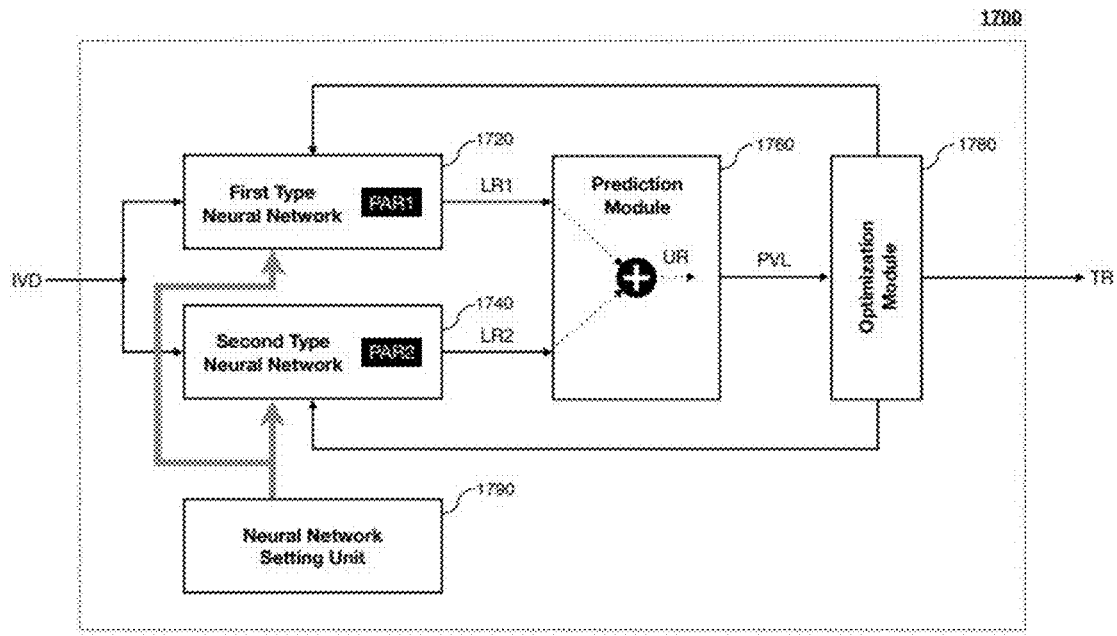
Figure 18:
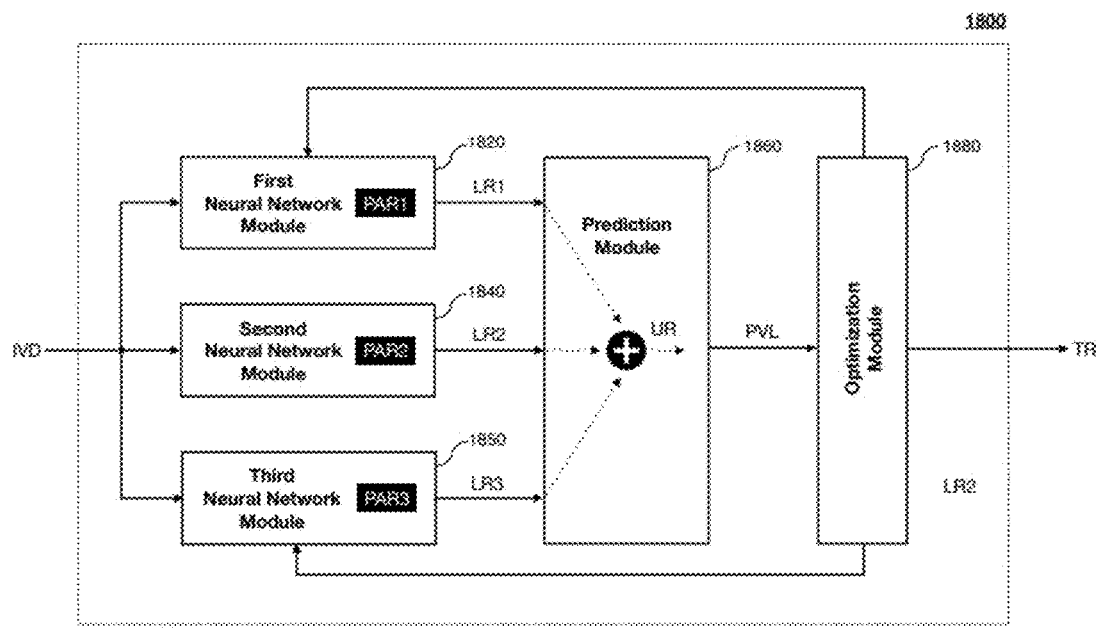

FIG. 16, FIG. 17 and FIG. 18 are diagrams illustrating hybrid neural network-based object tracking learning systems, according to an embodiment of the present disclosure.

First of all, referring to FIG. 16, an object tracking learning system 1600 according to an embodiment of the present disclosure includes a time-invariant learning module 1620, a time-varying learning module 1640, a prediction module 1660, and an optimization module 1680. In this case, the time-invariant learning module 1620 modeled through pre-training may output the first learning result LR1 for the input image IVD, and the time-varying learning module 1640 may output the second learning result LR2 for the input image IVD through pre-training and real-time online learning. The time-invariant learning module 1620 may be a DNN of which the weight is reduced by quantizing the first parameter PAR1 into an integer, and the time-varying learning module 1640 may be a DNN of which the weight is reduced in a channel pruning method of partially removing the connection of the second parameter PAR2.

The prediction module 160 may generate the prediction value PVL for an object to be tracked from the input image IVD based on the summation result SR obtained by summing the first learning result LR1 and the second learning result LR2. The optimization module 1680 may update the first parameter PAR1 and the second parameter PAR2 based on the prediction value PVL received from the prediction module 160.

Next, referring to FIG. 17, an object tracking learning system 1700 according to an embodiment of the present disclosure may include a first method neural network 1720, a second method neural network 1740, a prediction module 1760, and an optimization module 1780.

In this case, the first method neural network 1720 and the second method neural network 1740 may be heterogeneous neural network modules. For example, the first method neural network 1720 may be implemented as a lightweight DNN to which quantization technology is applied, and the second method neural network 1740 may be implemented as a lightweight DNN to which pruning technology is applied. Alternatively, the first method neural network 1720 may be implemented as a DNN for time-invariant learning, and the second method neural network 1740 may be implemented as a lightweight DNN for time-varying learning.

Alternatively, the first method neural network 1720 and the second method neural network 1740 may be neural network modules having different performances from each other. For example, the bit width of the first learning result LR1 may be different from the bit width of the second learning result LR2. For example, the first method neural network 1720 may output the first learning result LR1 of a coarse scale for the input image IVD, and the second method neural network 1740 may output the second learning result LR2 of a fine scale for the input image IVD.

The object tracking learning system 1700 of FIG. 17 may further include a neural network setting unit 1790. The neural network setting unit 1790 may differently set the combination of the first neural network module 120 and the second neural network module 140 based on the accuracy or computational amount required for object tracking learning of the input image IVD. For example, when there are resource constraints on the object tracking learning system 100 and there is a specific standard of demand for accuracy, the neural network setting unit 1790 may set the first neural network module 120 to a low-bit quantization network and may set the second neural network module 140 to a high-precision pruning network. For example, the neural network setting unit 1790 may set an optimal heterogeneous neural network module by applying a neural architecture search (NAS) algorithm.

In addition, although not shown, the object tracking learning system 1700 of FIG. 17 may further include the pre-training module 110 of FIG. 11 or the online tracking module 190 of FIG. 12.

Next, referring to FIG. 18, an object tracking learning system 1800 according to an embodiment of the present disclosure may include a first neural network module 1820, a second neural network module 1840, a prediction module 1860, and an optimization module 1880. The first neural network module 1820, the second neural network module 1840, the prediction module 1860, and the optimization module 1880 may be provided in the same or similar structure to the first neural network module 120, the second neural network module 140, the prediction module 160, and the optimization module 180 in FIG. 1. Furthermore, the object tracking learning system 100 of FIG. 18 may further include a third neural network module 1850 based on the accuracy or computational amount required for object tracking learning of the input image IVD. In this case, the prediction module 160 may generate the prediction value PVL by receiving and summing the learning results LR1, LR2, and LR3 respectively received from the first neural network module 1820, the second neural network module 1840, and the third neural network module 1850.

As such, in accordance with the object tracking learning method and system according to an embodiment of the present disclosure, accurate and efficient learning may be performed even in various situations.

Hereinafter, although representative embodiments of the present disclosure have been described in detail, those of ordinary skill in the art(s) to which the present disclosure pertains will understand that various modifications are capable of being made to the above-described embodiments without departing from the scope the present disclosure. Therefore, the scope of the present disclosure should not be limited to the described embodiments, but it should be defined by not only the claims described below, but also the claims and equivalents.

According to an embodiment of the present disclosure, a hybrid neural network-based object tracking learning method and system may quickly perform computation with fewer resources while accuracy is maintained, by using a separate neural network for image frames in parallel.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An object tracking learning system, the learning system comprising:
    a first neural network module configured to express and learn a first parameter for an input image from a first type to a second type and to output a learned result as a first learning result;
    a second neural network module configured to remove and learn a connection of a part of a second parameter for the input image and to output the learned result as a second learning result;
    a prediction module configured to generate a prediction value for an object of the input image from a summation result obtained by summing the first learning result and the second learning result; and
    an optimization module configured to update the first parameter and the second parameter based on the prediction value.

2. The learning system of claim 1, wherein the first neural network module includes a (1-1)-th quantization unit configured to quantize a parameter having the first type of a real number type into a parameter having the second type of an integer type.

3. The learning system of claim 2, wherein the (1-1)-th quantization unit quantizes the parameter having the first type into the parameter having the second type in response to a center and width of an target interval for the parameter of the first type.

4. The learning system of claim 2, wherein the first neural network module further includes a (1-2)-th quantization unit configured to quantize an activation value having the first type into an activation value having the second type.

5. The learning system of claim 1, wherein the second neural network module includes a channel pruning unit configured to prune a channel corresponding to a part of the second parameter having the first type.

6. The learning system of claim 1, wherein the first neural network module includes a (1-1)-th quantization unit configured to quantize a first parameter having the first type of a real number type into a first parameter having the second type of an integer type, and
    wherein the second neural network module includes a channel pruning unit configured to prune a channel corresponding to a part of the second parameter having the first type.

7. The learning system of claim 1, wherein the optimization module includes:
    a loss adjusting unit configured to adjust a loss of each of the first learning result, the second learning result, and the prediction value; and
    a backpropagation performing unit configured to perform backpropagation based on the adjusted loss.

8. The learning system of claim 1, further comprising:
    a pre-training module configured to perform pre-training on a test image by performing pre-training on the first neural network module and the second neural network module and to set an initial value of a parameter for the input image.

9. The learning system of claim 8, further comprising:
    an online tracking module configured to allow the second neural network module to learn the input image, which is a streaming image, in real time.

10. The learning system of claim 9, wherein the prediction module includes:
    a learning result summation unit configured to generate the summation result by summing the first learning result of the first neural network module, which is pre-trained, and the second learning result of the second neural network module, which is learned online.

11. The learning system of claim 1, further comprising:
    a neural network design module configured to differently set a combination of the first neural network module and the second neural network module based on a first standard.

12. The learning system of claim 1, wherein the first learning result is expressed in an integer type,
    wherein the second learning result is expressed in a real number type, and
    wherein the summation result is expressed by mixing the integer type and the real number type.

13. A hybrid neural network-based object tracking learning method, the method comprising:
    expressing a first parameter for an input image from a first type to a second type and outputting an expressed result as a first learning result;
    removing a connection of a part of a second parameter for the input image and outputting a removed result as a second learning result;
    generating a prediction value based on a summation result obtained by summing the first learning result and the second learning result; and
    updating the first parameter and the second parameter based on the prediction value.

14. The method of claim 13, wherein the outputting of the expressed result as the first learning result includes:
    quantizing a parameter having the first type of a real number type into a parameter having the second type of an integer type, and
    wherein the outputting of the removed result as the second learning result includes:
    pruning a channel corresponding to the part of the second parameter.

15. The method of claim 13, wherein the generating of the prediction value includes:
    summing the first learning result of a first neural network module, which is pre-trained, and the second learning result of a second neural network module, which is learned online, as the summation result.

16. The method of claim 13, wherein the first learning result is expressed in an integer type,
    wherein the second learning result is expressed in a real number type, and
    wherein the summation result obtained by summing the first learning result and the second learning result is expressed by mixing the integer type and the real number type.

* * * * *